US008649746B2

(12) United States Patent
Kang et al.

(10) Patent No.: US 8,649,746 B2
(45) Date of Patent: Feb. 11, 2014

(54) APPARATUS AND METHOD FOR PROCESSING REDUCED BANDWIDTH ENVELOPE TRACKING AND DIGITAL PRE-DISTORTION

(71) Applicant: Samsung Electronics Co. Ltd., Suwon-si (KR)

(72) Inventors: In-Tae Kang, Seongnam-si (KR); Sang-Min Bae, Yongin-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/624,358

(22) Filed: Sep. 21, 2012

(65) Prior Publication Data

US 2013/0072139 A1 Mar. 21, 2013

(30) Foreign Application Priority Data

Sep. 21, 2011 (KR) ........................ 10-2011-0095051

(51) Int. Cl.
  *H04B 1/04* (2006.01)
  *H01Q 11/12* (2006.01)
(52) U.S. Cl.
  USPC .................... 455/114.3; 455/127.1; 375/296; 375/297; 330/149

(58) Field of Classification Search
  USPC ............ 455/63.1, 67.13, 114.2, 114.3, 127.1; 375/296, 297; 330/149, 296, 297
  See application file for complete search history.

(56) References Cited

U.S. PATENT DOCUMENTS

| 7,313,373 | B1 * | 12/2007 | Laskharian et al. | ........ 455/127.1 |
| 7,634,024 | B2 * | 12/2009 | Tan | ............................. 375/297 |
| 7,847,631 | B2 * | 12/2010 | Jiang et al. | ..................... 330/149 |
| 8,306,149 | B2 * | 11/2012 | Mujica et al. | ................. 375/296 |
| 8,351,877 | B2 * | 1/2013 | Kim et al. | .................. 455/114.3 |

\* cited by examiner

*Primary Examiner* — Quochien B Vuong
(74) *Attorney, Agent, or Firm* — Jefferson IP Law, LLP

(57) ABSTRACT

An apparatus and a method for processing reduced bandwidth Envelope Tracking (ET) and Digital Pre-Distortion (DPD) are provided. The apparatus includes a Crest Factor Reduction (CFR) unit, a resealing Digital Pre-Distortion (DPD) unit, an envelope converter, a Supply Modulator (SM), and a Power Amplifier (PA). The CFR unit suppresses an increase of a side lobe occurring when a Peak to Average Power Ratio (PAPR) decreases with respect to a signal generated in a baseband according to a standard and passes through a transmit (Tx) filter. The resealing DPD unit receives an original envelope amplitude and a reduced bandwidth envelope amplitude of an In-phase/Quadrature-phase (I/Q) signal output from the CFR unit to perform a pre-distortion process. The envelope converter converts an envelope signal to a reduced bandwidth envelope signal based on the I/Q signal output from the CFR unit.

13 Claims, 20 Drawing Sheets

APPARATUS AND METHOD FOR PROCESSING REDUCED BANDWIDTH ENVELOPE TRACKING AND DIGITAL PRE-DISTORTION

PRIORITY

This application claims the benefit under 35 U.S.C. §119 (a) of a Korean patent application filed on Sep. 21, 2011 in the Korean Intellectual Property Office and assigned Serial No. 10-2011-0095051, the entire disclosure of which is hereby incorporated by reference.

BACKGROUND OF THE INVENTION

1. Field of the Invention

The present invention relates to an apparatus and a method for processing reduced bandwidth Envelope Tracking (ET) and Digital Pre-Distortion (DPD).

2. Description of the Related Art

As a mobile communication standard passes through a 2nd generation (2G) and a 3rd generation (3G) and evolves to a 4th generation (4G), a wireless communication system processes a signal of a high data rate and requires a transmission signal in a broadband and a complicated modulation method. For example, a transceiver processes a broadband signal and a signal having a high Peak to Average Power Ratio (PAPR). Accordingly, a transceiver of a wireless communication system has a high efficiency, a broadband signal processing capability, and a linear amplify characteristic.

To achieve these characteristics, a wireless communication system uses a Power Amplifier (PA) of a polar modulation scheme.

In a case of using the polar modulation scheme, a transmitter separates a phase component and an envelope component of an input signal. Thereafter, the transmitter up-converts the phase component to a Radio Frequency (RF) signal to provide the input signal of the PA, and modulates the envelope component using a Supply Modulator (SM) to provide the envelope component to a collector/drain source of the PA. The PA amplifies the up-converted phase component provided via an input terminal using the modulated envelope component provided via the collector/drain terminal to maintain a high efficiency and linearity of a high PAPR signal.

In a 3G/4G communication system, due to an increase in an amount of used by a multimedia service, a power consumption issue has emerged as an important problem.

Since a power amplification efficiency is closely related to heat generated from a power device, when the power amplification efficiency is poor, much heat is generated which not only deteriorates a characteristic and durability of the device but also increases cooling system costs. Accordingly, implementing a linear PA having a high power amplification efficiency lowers system and maintenance costs, and guarantees the performance and durability of the power device.

A PA of the related art has at least two shortcomings A first shortcoming is illustrated with respect to FIG. 1.

FIG. 1 is a graph illustrating a PA in a case where a supply voltage is a fixed value according to the related art.

Referring to FIG. 1, in the PA, since a supply voltage Vdd is a fixed value, residual power after generating a signal is transformed to heat and thus is wasted, and an additional cooling solution for resolving high heat generation is required, which increases hardware costs. To address this issue, various power amplification technologies, such as Envelope Tracking (ET), Envelope Elimination and Restoration (EER), Doherty, and the like, have been suggested.

FIG. 2 is a graph illustrating a PA by an ET supply voltage according to the related art. FIG. 3 illustrates an ET PA according to the related art.

Referring to FIGS. 2 and 3, unlike the PA of the related art, the ET of the related art uses an SM and not a fixed voltage. The SM adaptively applies a supply voltage depending on an envelope of an RF input signal, thereby raising power efficiency and minimizing power consumption. Since ET has a small hardware complexity compared to a Doherty PA, ET draws attention when an operator desires to obtain a high efficiency with small complexity as in a terminal.

A second problem of the PA of the related art is that Out Of Band (OOB) spectrum radiation is high and an Adjacent Channel Leakage Ratio (ACLR) is lowered, which acts as an interference to other users. To address this problem, a Digital Pre-Distortion (DPD) technology is suggested.

DPD allows an overall input/output curve to form linearity by distorting a relevant signal in advance depending on non-linearity of a PA before amplifying the signal.

FIG. 4 is a graph illustrating DPD for PA linearization according to the related art.

Referring to FIG. 4, an output power curve for input power of a PA gradually saturates at high power as in a first line 401. Accordingly, when the PA pre-distorts an input signal in a baseband as in a second line 403 according to DPD, the linearity of a final PA output improves as in a third line 405.

FIG. 5 is a block diagram illustrating a transmitter structure that combines an open loop DPD with an ET that applies a 1-dimensional (1D) Shaping Function (SF) according to the related art.

Referring to FIG. 5, a first path in a transmitter via a Crest Factor Reduction (CFR) 502, a DPD 504, an In-phase/Quadrature-phase (I/Q) mismatch unit 506, an Inverse Sinc Filter 508, a first Digital Analog Converter (DAC) 510, a first Low Pass Filter (LPF) 512, an up converter 514, a Driving Amplifier (DA) 516, and a PA 518 represents a data path of an I/Q signal. A second path via a fractional delay filter 520, an envelope detector 522, an envelope converter 524, a second DAC 526, a second LPF 528, and a Supply Modulator (SM) 530 represents an envelope path of an I/Q signal.

As described above, in a case of including the data path and the envelope path, the transmitter requires time-axis alignment on a sub-sample basis as well as delay on a sample basis in order to adjust a delay difference between the data path and the envelope path. For this purpose, the transmitter uses the fractional delay filter 520.

Generally, it is known that a bandwidth of an envelope signal is three to four times greater than a bandwidth of an I/Q signal. Accordingly, for the SM 530, to meet a wide bandwidth of an envelope signal, a hybrid type simultaneously including a linear amplifier and a switching amplifier is used, which increases hardware complexity. In a case where an uplink and a downlink are not clearly separated in a wireless communication system that uses a Frequency Domain Duplex (FDD), an uplink signal leaks to a downlink by a wide bandwidth of an envelope signal to act as a receive (Rx) band noise and influence sensitivity of a receiver.

FIG. 6 is a graph illustrating use of a 1D SF for reducing bandwidth of an envelope signal according to the related art.

Referring to FIG. 6, assuming that a minimum voltage for a normal operation allowing the PA 518 to obtain an appropriate gain and efficiency is a knee voltage, the knee voltage corresponds to a first horizontal line 601 (value=0.37). In a case of using this input/output transfer function, a drastic change of an envelope signal occurs in the vicinity of the knee voltage, and as a result, a high frequency component occurs, which deteriorates a spectrum performance and consequently, deteriorates an Adjacent Channel Power (ACP) performance. Therefore, when a curve having a smooth transition, such as a second line 603, is used, power efficiency and an ACP performance are balanced, and ACP performance deterioration may be mitigated to some degree. However, according to an analysis of an experiment, in a case of maintaining a knee voltage at a level of 0.1-0.3 in order to maintain power efficiency, a spectrum performance is not satisfactory and a desired bandwidth reduction effect is difficult to obtain. In contrast, when the knee voltage is raised by about 0.4-0.5 in order to improve the spectrum performance, the spectrum performance improves but power efficiency falls down excessively, and as a result, utility of using ET falls down.

FIG. 7 is a graph illustrating a time domain envelope shape having a reduced bandwidth according to the related art.

Referring to FIG. 7, when using an LPF, which is a technique for reducing a bandwidth of an envelope signal, a filtered envelope (i.e., a dotted line 703) may not properly follow the original signal envelope 701. In a case where a filtered signal LPF {e(t)} 703 is smaller than an original signal e(t) 701, a transmitter cannot provide sufficient Vdd to a PA, and as a result, a Radio Frequency Integrated Circuit (RFIC) generates oscillation and a frequency component may be distorted at an undesired position.

FIG. 8 is a block diagram illustrating a bandwidth reduction according to the related art.

Referring to FIG. 8, to address the aforementioned issue of frequency distortion, a technique where a transmitter repeatedly applies a half-wave rectifier 810 and an LPF2 820 to reduce a bandwidth of an envelope signal is suggested. However, such a technique may represent a shape similar to repeated clipping and filtering, which is a kind of a PAPR reducing method. For example, the technique of reducing a bandwidth of an envelope signal by repeatedly applying the half-wave rectifier 810 and the LPF2 820 has an initial pass and a repetitive pass, and an LPF1 815 and an LPF2 820 are LPFs of more than 100 taps and correspond to a substantially unusable algorithm with consideration of hardware complexity and a delay.

FIGS. 9A and 9B are graphs illustrating a requirement of a predefined repetitive path in reducing bandwidth of an envelope signal according to the related art.

Referring to FIGS. 9A and 9B, 4-5 times of a repetitive pass process should be performed to make a bandwidth of an envelope signal smaller than a bandwidth of an original signal. However, the bandwidth of the envelope signal is not completely removed, and an excessive hardware complexity is imperative for a plurality of repetitions.

Therefore, a need exists for a method and an apparatus capable of efficiently reducing a bandwidth of an envelope in aspects of hardware complexity and delay when using ET.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus capable of efficiently reducing a bandwidth of an envelope in aspects of hardware complexity and delay when using Envelope Tracking (ET).

When reduced bandwidth ET is used, use of 2-dimensional (2D) Digital Pre-Distortion (DPD) is indispensable, and creates hardware complexity and other disadvantages in an aspect of an operation as described above. Therefore, another aspect of the present invention is to provide a method and an apparatus capable of replacing 2D DPD using only 1-dimension.

In accordance with an aspect of the present invention, an apparatus for processing reduced bandwidth ET and DPD is provided. The apparatus includes a Crest Factor Reduction (CFR) unit configured to suppress an increase of a side lobe occurring when a Peak to Average Power Ratio (PAPR) decreases with respect to a signal generated in a baseband according to a standard and passes through a transmit (Tx) filter, a resealing Digital Pre-Distortion (DPD) unit configured to receive an original envelope amplitude and a reduced bandwidth envelope amplitude of an In-phase/Quadrature-phase (I/Q) signal output from the CFR unit to perform a pre-distortion process, an envelope converter configured to convert an envelope signal to a reduced bandwidth envelope signal based on the I/Q signal output from the CFR unit, a Supply Modulator (SM) configured to modulate a signal output from the envelope converter to generate power, and a Power Amplifier (PA) configured to amplify an input signal based on a signal output from the resealing DPD unit using power generated by the SM.

The apparatus may further include a down converter configured to down-convert the I/Q signal captured from the PA, and a calibration performing unit configured to compare the I/Q signal down-converted by the down converter with the I/Q signal output from the CFR unit to perform calibration on the resealing DPD unit.

The apparatus may further include a fractional delay filter configured to perform time axis alignment of a sub-sample level on the I/Q signal output from the CFR unit.

The apparatus may further include an envelope detector configured to calculate a square root of $(I^2+Q^2)$ with respect to the I/Q signal output from the fractional delay filter to detect the envelope signal.

The apparatus may further include a half-wave rectifier configured to output, when an envelope input signal is greater than a knee voltage, a value obtained by subtracting the knee voltage from the envelope input signal, and output zero, when the envelope input signal is less than the knee voltage, a gain control performing unit configured to perform gain control on an output of the envelope converter, and a knee voltage compensator configured to add the knee voltage to an output of the gain control performing unit.

The envelope converter may include a Window Envelope Detector (WED) configured to receive the envelope signal $q(n)$ to calculate a windowed envelope signal $E\{q(n)\}$, a window coefficient multiplier configured to apply a delay within the WED and multiply a window coefficient, a maximum value calculator configured to calculate a maximum value of results obtained by multiplying the window coefficient using the window coefficient multiplier, and a Low Pass Filtering (LPF) unit configured to receive the windowed envelope signal $E\{q(n)\}$ to perform low pass filtering, wherein the envelope converter multiplies a result of the LPF unit by a gain value, and selects a maximum value among the value multiplied by the gain value and an output of the WED.

The resealing DPD unit may include an amplitude and phase converter configured to receive the I/Q signal from the CFR unit and convert the I/Q signal to an amplitude and a phase, an amplitude pre-distortion calculator configured to calculate pre-distortion of an amplitude using at least one of the amplitude converted by the amplitude and phase converter, the reduced bandwidth envelope signal, an amplitude Look Up Table (LUT) updated while calibration is performed, and a modeling equation of the PA, an amplitude multiplier configured to multiply a value calculated by the amplitude pre-distortion calculator by the amplitude converted by the amplitude and phase converter, a phase pre-distortion calculator configured to calculate phase pre-distortion using at least one of the amplitude value to which amplitude pre-distortion has been applied by the amplitude pre-distortion calculator, the reduced bandwidth envelope signal, a phase LUT updated while calibration is performed, and a modeling equation of the PA, a phase adder configured to add a value calculated by the phase pre-distortion calculator to the phase converted by the phase converter, and an I/Q converter configured to convert an amplitude/phase signal, to which pre-distortion has been applied, to an I/Q signal.

In accordance with another aspect of the present invention, a method for processing reduced bandwidth ET and DPD is provided. The exemplary method includes suppressing an increase of a side lobe occurring when a PAPR decreases with respect to a signal generated in a baseband according to a standard and passes through a Tx filter, converting an envelope signal to a reduced bandwidth envelope signal based on an I/Q signal output via the side lobe increase suppression process, receiving an original envelope and a reduced bandwidth envelope of the I/Q signal output via the side lobe increase suppression process to perform pre-distortion, modulating a signal output via the envelope signal converting process to generate power, amplifying an input signal based on a signal output via the pre-distortion process using the generated power, capturing the I/Q signal from a PA and down-converting the I/Q signal, and performing calibration of the pre-distortion process by comparing the down-converted I/Q signal with a signal output via the side lobe increase suppression process.

The method may further include performing time axis alignment of a sub-sample level on the I/Q signal output via the side lobe increase suppression process.

The method may further include calculating a square root of (I2+Q2) with respect to the I/Q signal, output via the time axis alignment performing process, to detect an envelope signal.

The envelope signal converting process may include, when an envelope input signal is greater than a knee voltage, outputting a value obtained by subtracting the knee voltage from the envelope input signal, and when the envelope input signal is less than the knee voltage, outputting zero, performing gain control on an output via the envelope signal converting process, and adding the knee voltage to an output via the gain control performing process.

The envelope signal converting process may include receiving the envelope signal q(n) to calculate a windowed envelope signal E{q(n)}, applying a delay within the windowed envelope signal calculation process and multiplying a windowed coefficient, calculating a maximum value of results multiplied by the window coefficient, receiving the windowed envelope signal E{q(n)} to perform LPF, and multiplying the LPF performance result by a gain value, and selecting a maximum value among an output value multiplied by the gain value and an output of the calculation process of the windowed envelope signal.

The pre-distortion process may include receiving the I/Q signal via the side lobe increase suppression process to convert the I/Q signal to an amplitude and a phase, calculating pre-distortion of the amplitude using at least one of the amplitude converted by the converting process, the reduced bandwidth envelope signal, an amplitude LUT updated while calibration is performed, and a modeling equation of the PA, multiplying a value calculated by the amplitude pre-distortion calculation process by the amplitude converted by the converting process, calculating phase pre-distortion using at least one of the amplitude value to which amplitude pre-distortion has been applied by the amplitude pre-distortion calculation process, the reduced bandwidth envelope signal, a phase LUT updated while calibration is performed, and a modeling equation of the PA, adding a value calculated by the phase pre-distortion calculation process to the phase converted by the phase converting process, and converting an amplitude/phase signal, to which pre-distortion has been applied, to the I/Q signal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
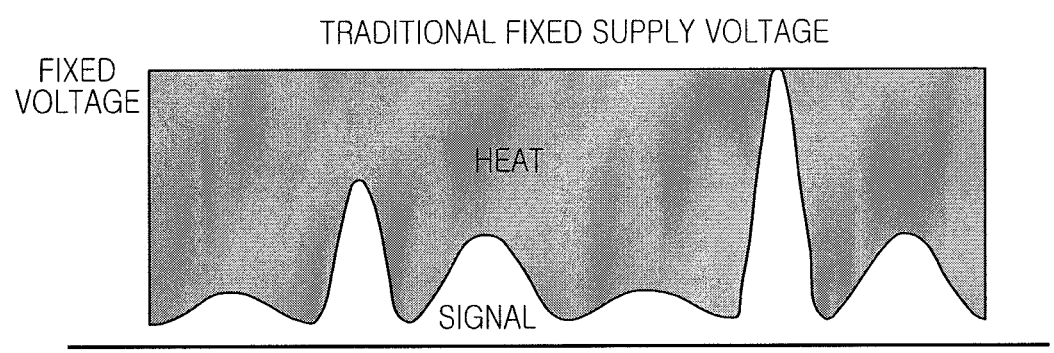
FIG. 1 is a graph illustrating a Power Amplifier (PA) in a case where a supply voltage is a fixed value according to the related art.
Figure 2:
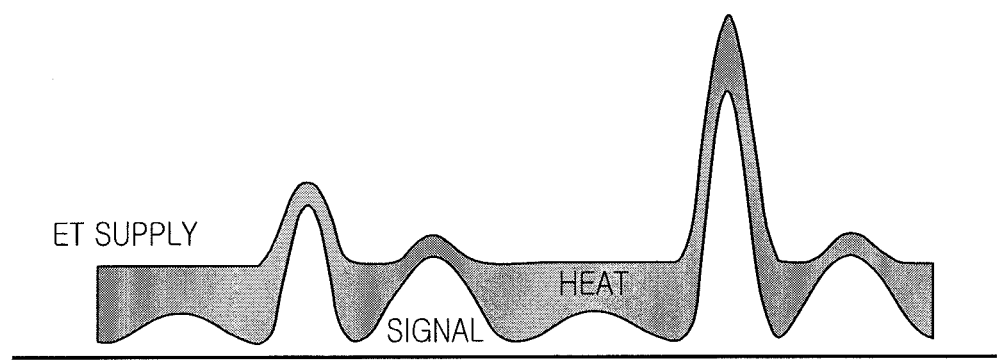
FIG. 2 is a graph illustrating a PA by an Envelope Tracking (ET) supply voltage according to the related art.
Figure 3:
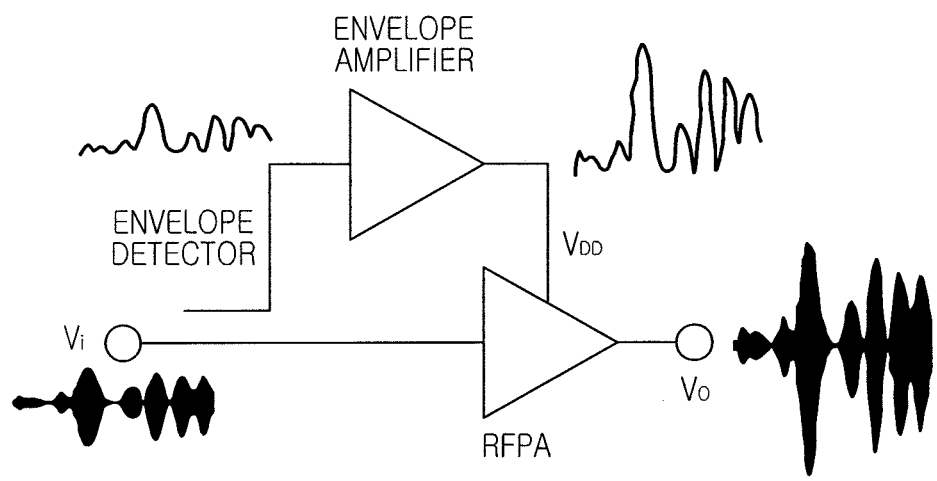
FIG. 3 illustrates an ET PA according to the related art.
Figure 4:
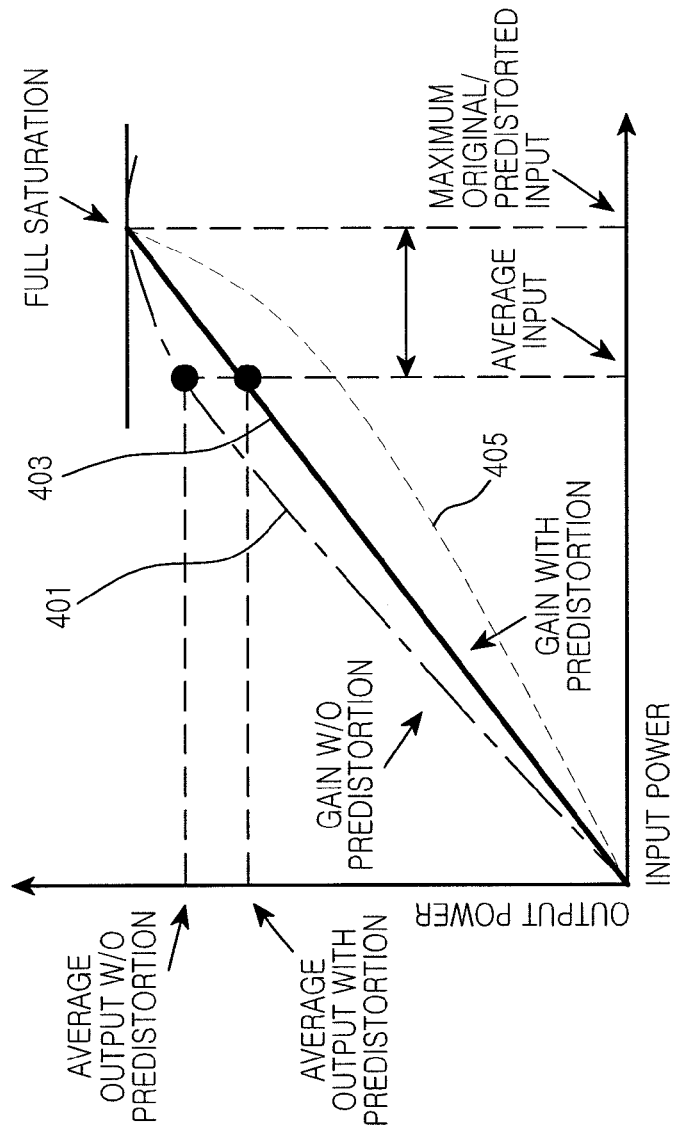
FIG. 4 is a graph illustrating Digital Pre-Distortion (DPD) for PA linearization according to the related art.
Figure 5:
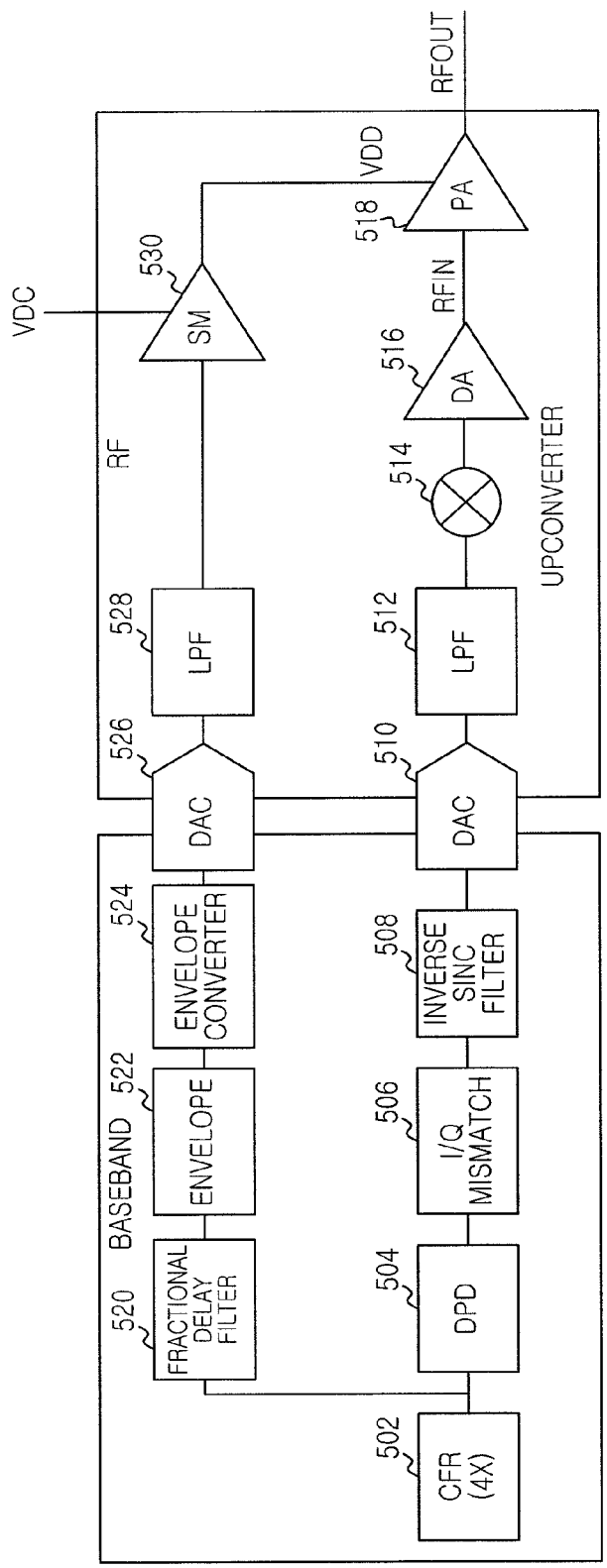
FIG. 5 is a block diagram illustrating a transmitter structure that combines an open loop DPD of the related art with an ET that applies a 1-dimensional (1D) Shaping Function (SF) according to the related art.
Figure 6:
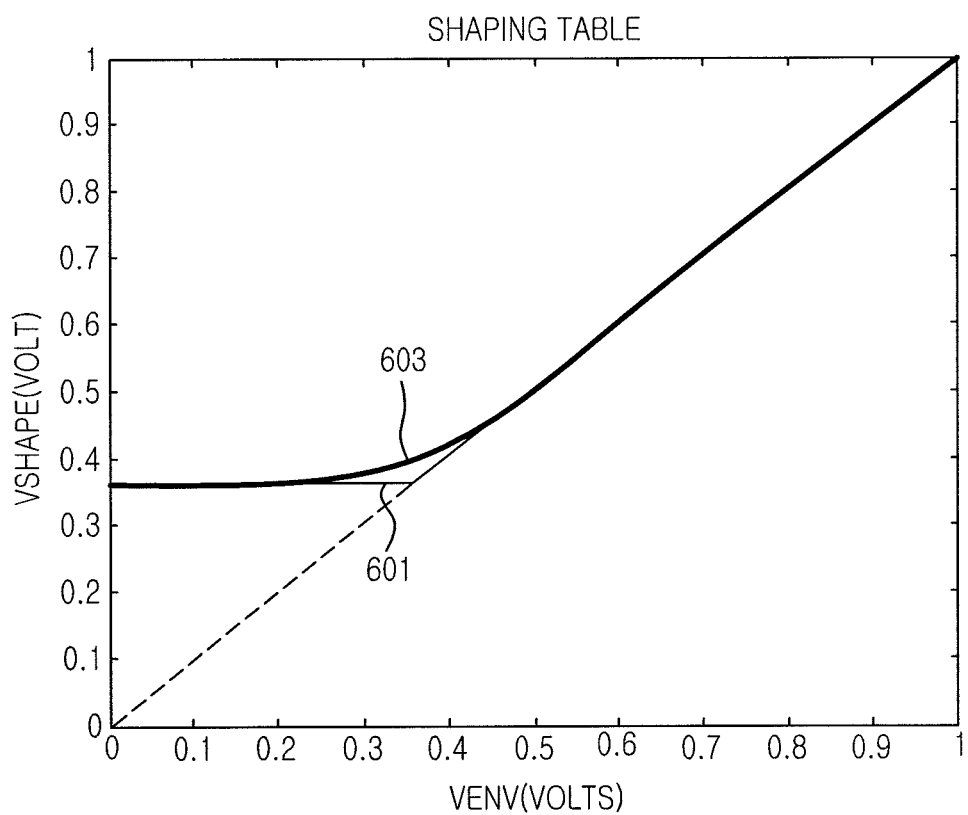
FIG. 6 is a graph illustrating a 1D SF for reducing bandwidth of an envelope signal according to the related art.
Figure 7:
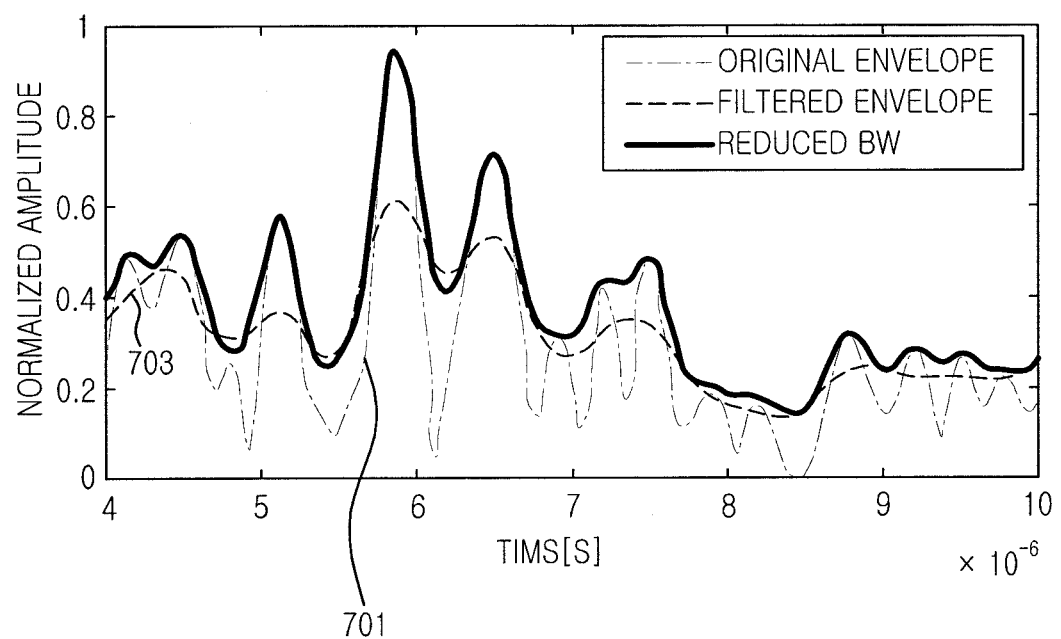
FIG. 7 is a graph illustrating a time domain envelope shape having a reduced bandwidth according to the related art.
Figure 8:
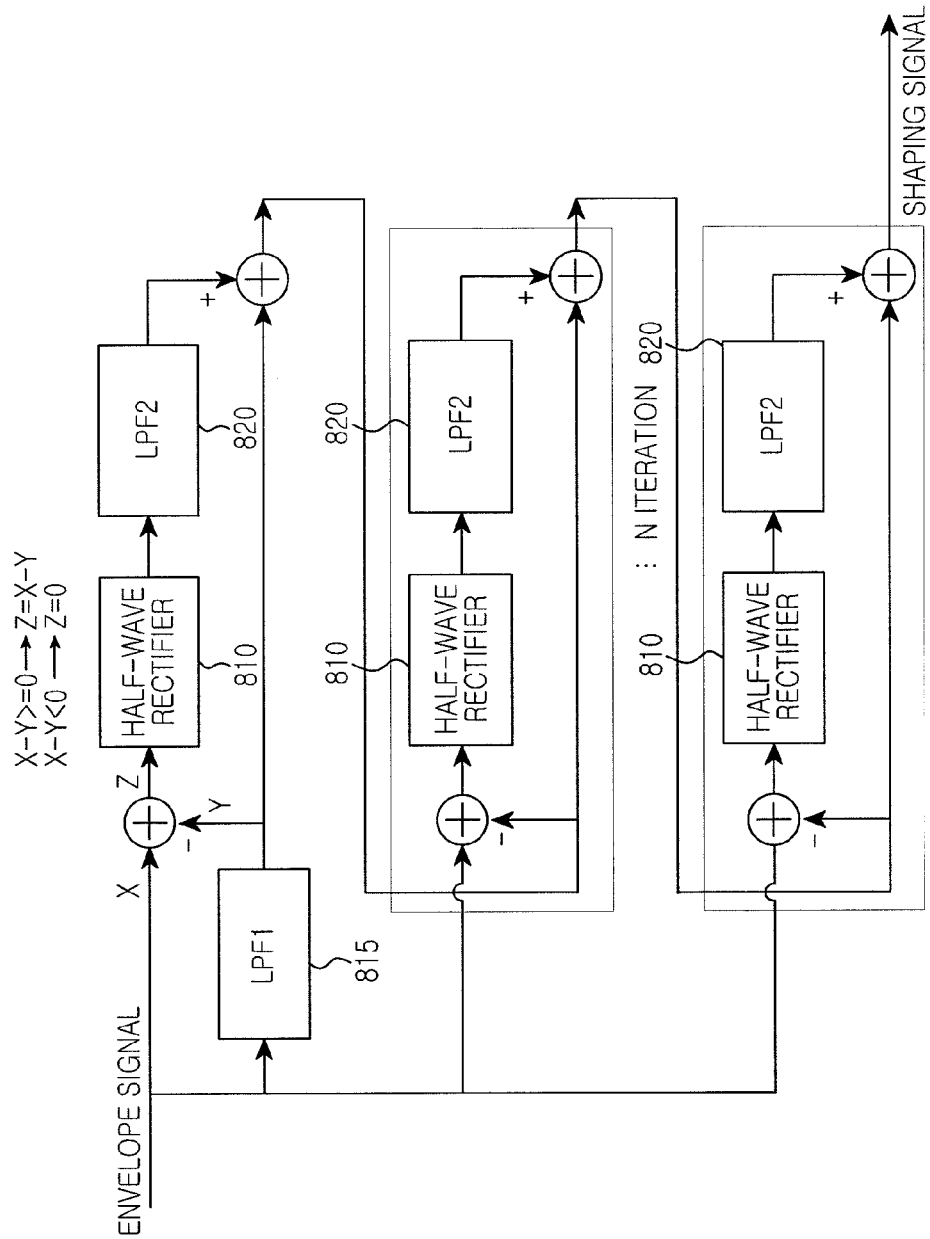
FIG. 8 is a block diagram illustrating a bandwidth reduction according to the related art.
Figures 9A, 9B:
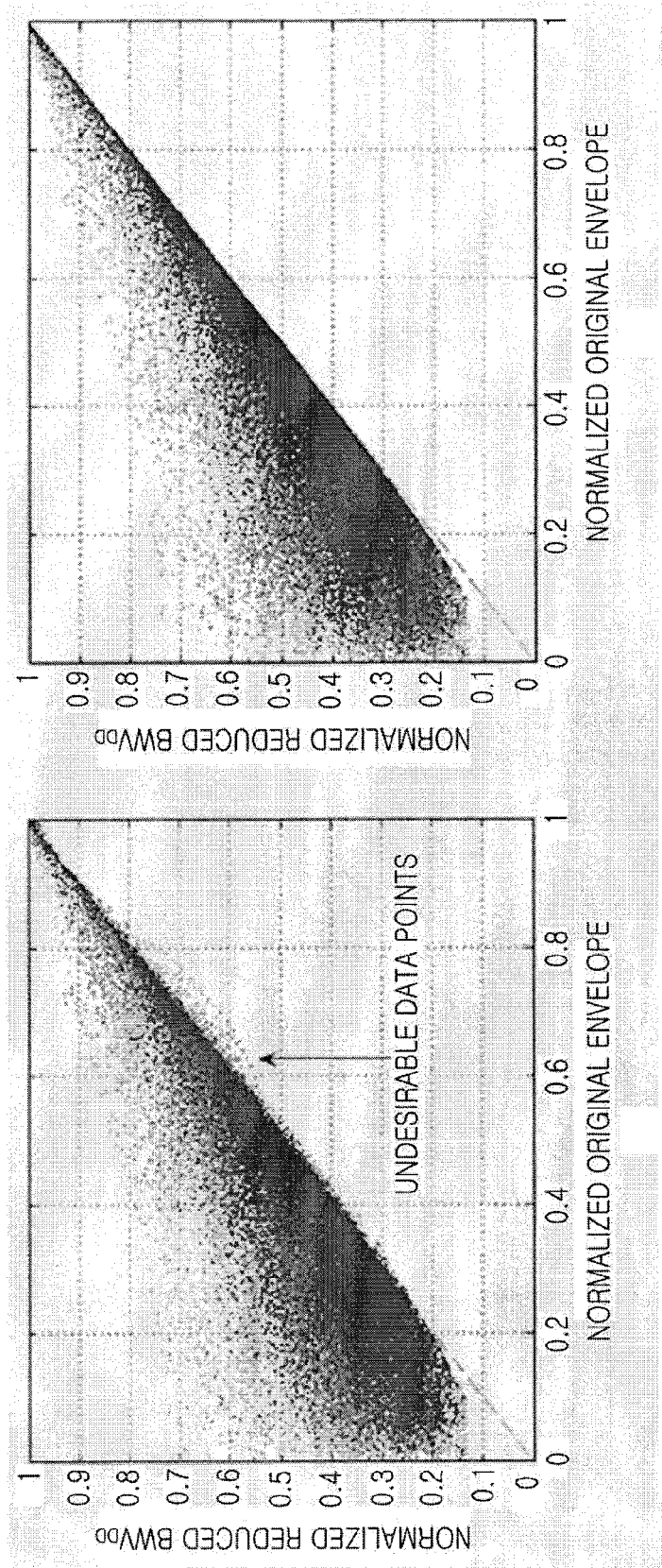
FIGS. 9A and 9B are graphs illustrating a requirement of a predefined repetitive path in reducing bandwidth of an envelope signal according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to an apparatus and a method for processing reduced bandwidth ET and DPD, capable of improving a power amplifier efficiency in a transmitter of a wireless communication system. Exemplary embodiments of the present invention provide a method for processing reduced bandwidth Envelope Tracking (ET) and Digital Pre-Distortion (DPD) in order to improve a power amplifier efficiency in a transmitter of a wireless communication system.

FIGS. 10 through 20, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 10:
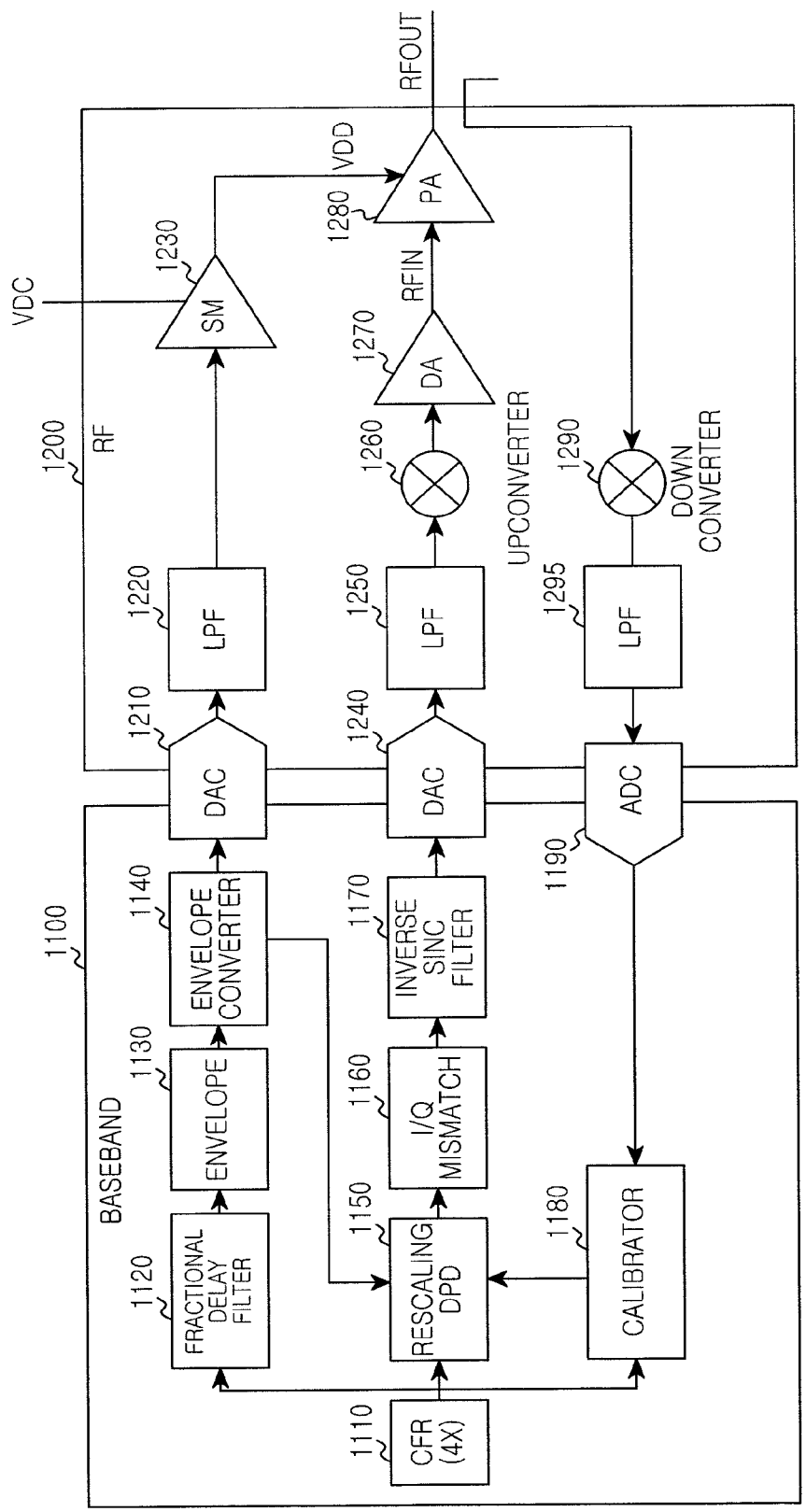
FIG. 10 is a block diagram illustrating an apparatus for processing reduced bandwidth ET and DPD according to an exemplary embodiment of the present invention.

FIG. 10 is a block diagram illustrating an apparatus for processing reduced bandwidth ET and DPD according to an exemplary embodiment of the present invention.

Referring to FIG. 10, an apparatus for processing reduced bandwidth ET and DPD having a 1-dimensional (1D) rescaling DPD may include a modem unit 1100 for processing a baseband and a Radio Frequency (RF) unit 1200 for RF processing. Here, the modem unit 1100 may include a Crest Factor Reduction (CFR) unit 1110, a fractional delay filter 1120, an envelope detector 1130, an envelope converter 1140, a rescaling DPD unit 1150, an In-phase/Quadrature-phase (I/Q) mismatch unit 1160, an Inverse Sinc Filter (ISF) 1170, a calibrator 1180, and an Analog Digital Converter (ADC) 1190. The RF unit 1200 may include a first Digital Analog Converter (DAC) 1210, a first Low Pass Filter (LPF) 1220, a Supply Modulator (SM) 1230, a second DAC 1240, a second LPF 1250, an up-converter 1260, a Driving Amplifier (DA) 1270, a Power Amplifier (PA) 1280, a down-converter 1290, and a third LPF 1295. At this point, the first DAC 1210 and the second DAC 1240 may be included in the modem unit 1100. The ADC 1190 may be included in the RF unit 1200.

A signal generated in a baseband according to a standard passes through a transmit (Tx) filter, and the CFR unit 1110 performs a function of suppressing an increase of a side lobe occurring when a PAPR decreases on this signal.

The fractional delay filter 1120 performs time axis alignment of a sub-sample level on an I/Q signal output from the CFR unit 1110. For example, the I/Q signal output from the CRF unit 1110 may experience accurate time alignment by way of the fractional delay filter 1120 in the envelope path.

The envelope detector 1130 detects an envelope signal by calculating a square root of (I2+Q2) with respect to an I/Q signal output from the fractional delay filter 1120.

Figure 11:
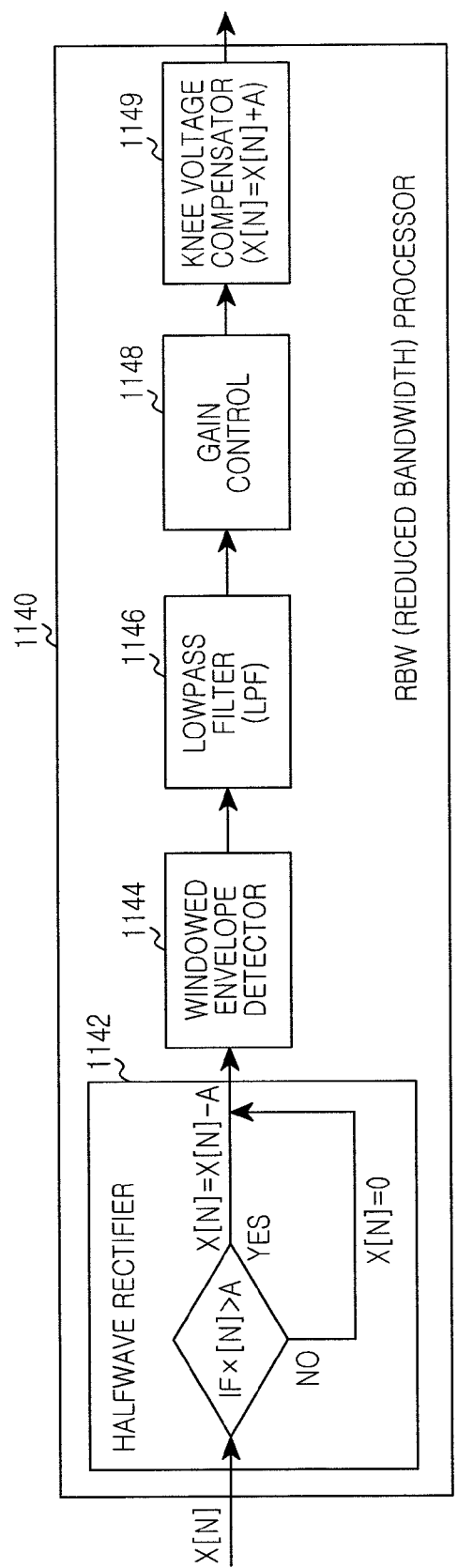
FIG. 11 is a block diagram illustrating an envelope converter for processing reduced bandwidth ET according to an exemplary embodiment of the present invention.

FIG. 11 is a block diagram illustrating an envelope converter for processing reduced bandwidth ET according to an exemplary embodiment of the present invention.

Referring to FIG. 11, the envelope converter 1140 converts an envelope signal detected by the envelope detector 1130 to a reduced bandwidth envelope. At this point, for ET process depending on the reduced bandwidth envelope, the envelope converter 1140 may include a half-wave rectifier 1142, a Windowed Envelope Detector (WED) 1144, a LPF 1146, a gain control performing unit 1148, and a knee voltage compensator 1149. Here, the WED 1144 and the LPF 1146 may be incorporated into one element called a Smoothed Windowed Envelope Detector (SWED).

When an envelope input signal x[n] is greater than a predefined knee voltage (A), the half-wave rectifier 1142 outputs a value obtained by subtracting the knee voltage (A) from the envelope input signal x[n]. In contrast, when the envelope input signal x[n] is less than the predefined knee voltage (A), the half-wave rectifier 1142 outputs zero.

Figure 12:
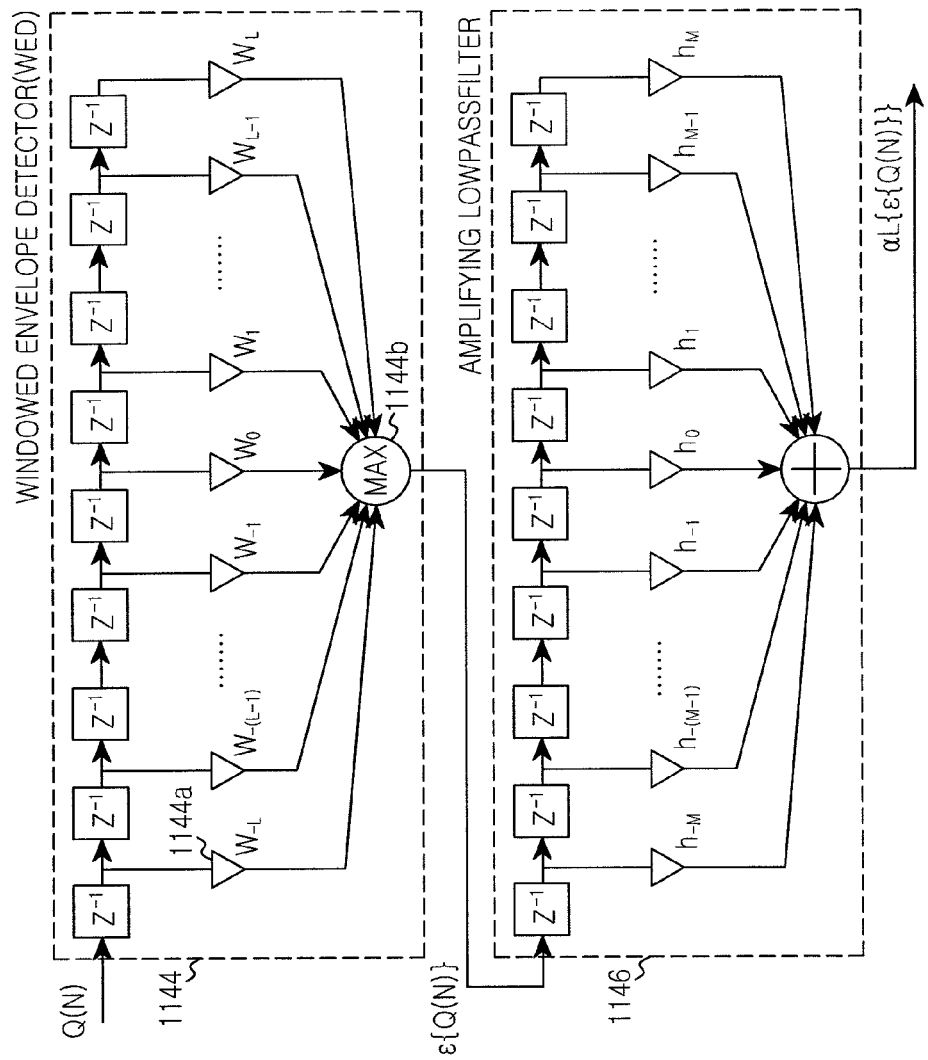
FIG. 12 is a block diagram illustrating a hardware structure for performing a Smoothed Windowed Envelope Detector (SWED) algorithm according to an exemplary embodiment of the present invention.

FIG. 12 is a block diagram illustrating a hardware structure for performing an SWED algorithm according to an exemplary embodiment of the present invention.

Referring to FIG. 12, the SWED may include a WED 1144 for receiving an envelope signal q(n) to calculate a windowed envelope signal E{q(n)}, a window coefficient multiplier 1144a for applying delay within the WED 1144 and multiplying a window coefficient, and a maximum value calculator 1144b for calculating a maximum value of results multiplied by a window coefficient via the window coefficient multiplier 1144a.

The structure of the WED 1144 may be derived from Equation (1) below.

$$\varepsilon\{q(n)\} \equiv \max \begin{Bmatrix} \ldots, q_{-k}w(n+k), \ldots, q_{-1}w(n+1), \\ q_0w(n), q_1w(n-1), \ldots, q_kw(n-k), \ldots \end{Bmatrix} \quad (1)$$

$$= \max_{-\infty < k < +\infty} \{q(k) \cdot w(n-k)\}$$

Herein, the $\varepsilon\{q(n)\}$ denotes a windowed envelope signal, the $q_k w(n-k)$ denotes a multiplication of an envelope signal and a window coefficient corresponding to delay k, the q(k) denotes the envelope signal, and the w(n−k) denotes the window coefficient corresponding to delay k.

At this point, when characteristics of w(n)=0|n|>L are used, Equation (1) may be rewritten as Equation (2) depending on change of variables.

$$\varepsilon\{q(n)\} = \max_{-\infty < k < +\infty} \{w(k) \cdot q(n-k)\} \quad (2)$$

$$\max_{-L \le k \le L} \{w(k) \cdot q(n-k)\}$$

Herein, the $\varepsilon\{q(n)\}$ denotes a windowed envelope signal, the q(n−k) denotes an envelope signal corresponding to delay k, and the w(n) denotes a window coefficient.

In a case of applying only the WED 1144, when a peak occurs at a cluster, two windows overlap and a portion where a slope of a signal rapidly changes in the center may occur. To address this issue, a smoothing function using a low pass filter, as illustrated in FIG. 14, is performed.

Figure 14:
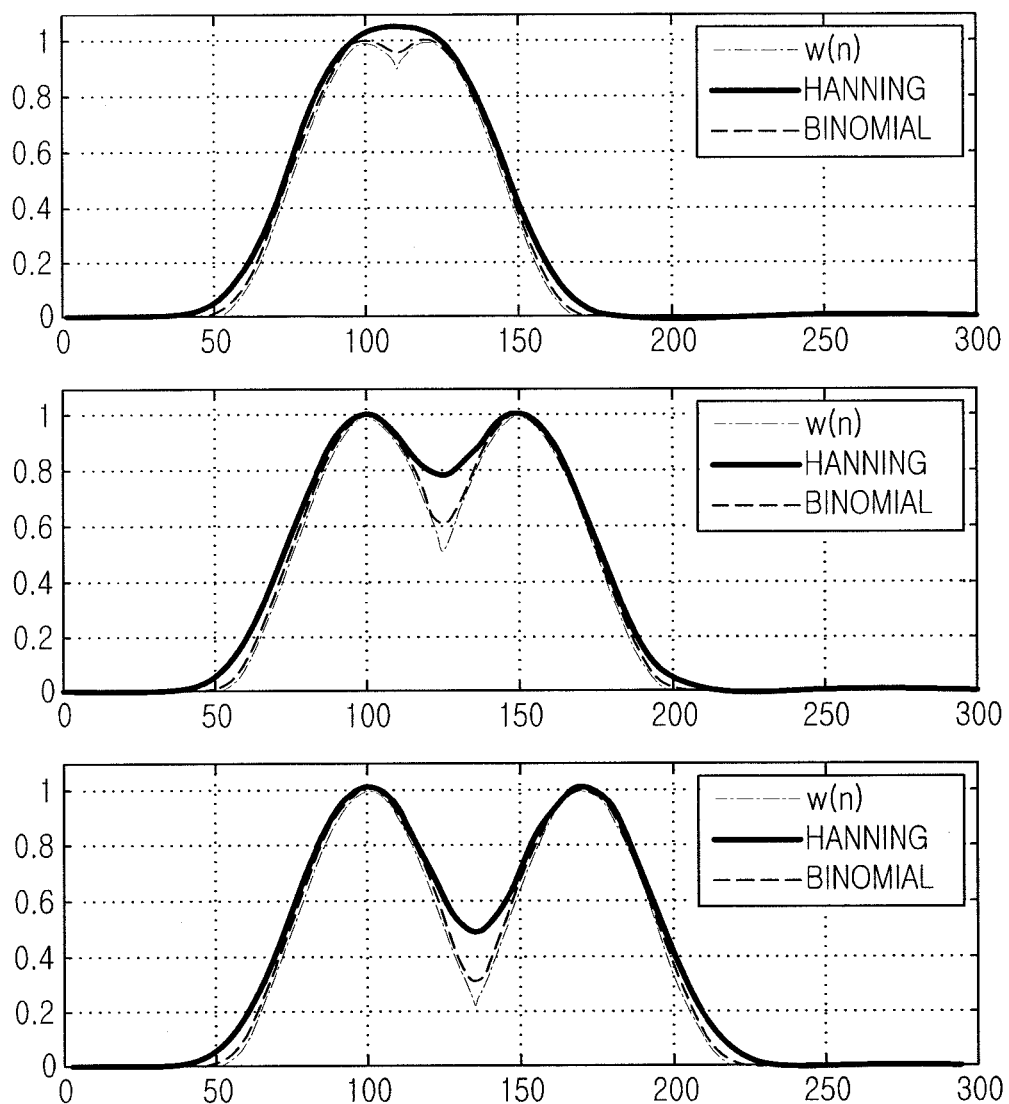
FIG. 14 illustrates graphs of different effects of cases of inserting a low pass filter to a WED according to an exemplary embodiment of the present invention.

FIG. 14 illustrates graphs of different effects of cases of inserting a low pass filter to a WED according to an exemplary embodiment of the present invention.

Referring to FIG. 14, the LPF unit 1146 receives a windowed envelope signal E{q(n)} to perform low pass filtering. However, in a case of applying low pass filtering, a value greater than the original envelope is not met, and as a result, peak regrowth may occur. To address this issue, the gain control performing unit 1148 multiplies a result of the low pass filtering by the LPF 1146 by a scaling factor alpha (gain value) to make the result be greater than the envelope.

The envelope converter 1140 may select a maximum value among the value multiplied by a gain value by the gain control performing unit 1148 and an output value of the WED 1144. At this point, the knee voltage compensator 1149 may add a knee voltage to the output value of the gain control performing unit 1148.

A signal output from the envelope converter 1140 is transferred to a first DAC 1210 and the resealing DPD unit 1150 of the RF unit 1200. Thereafter, an output signal of the first DAC 1210 passes through the first LPF 1220, and an adaptive Vdd voltage is provided to the PA 1280 depending on an amplitude of a signal by the SM 1230 that operates depending on an amplitude of a time axis-aligned reduced bandwidth envelope.

The resealing DPD unit 1150 receives an original envelope amplitude and a reduced bandwidth envelope amplitude with respect to an I/Q signal provided from the CFR unit 1110 and performs pre-distortion.

Figure 13:
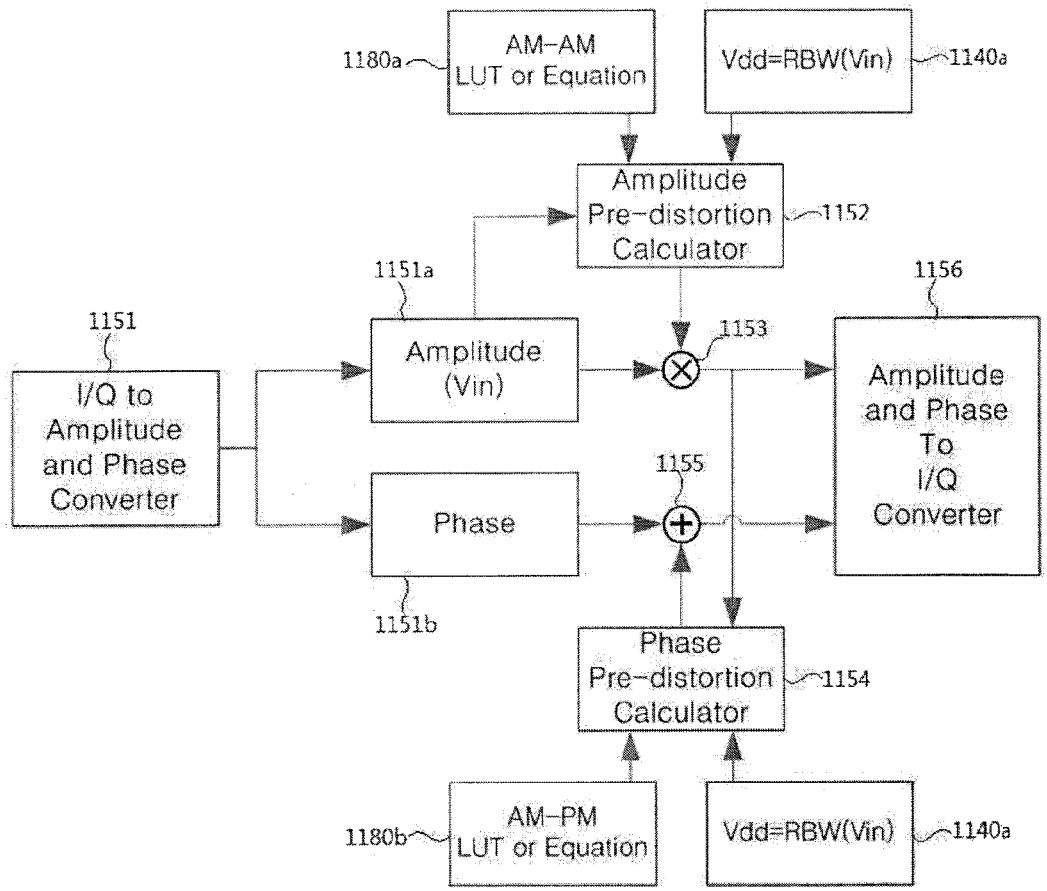
FIG. 13 is a block diagram illustrating an apparatus for realizing 1D resealing DPD according to an exemplary embodiment of the present invention.

FIG. 13 is a block diagram illustrating an apparatus for realizing 1D resealing DPD according to an exemplary embodiment of the present invention.

Referring to FIG. 13, the resealing DPD unit 1150 may include an amplitude and phase converter 1151, an amplitude pre-distortion calculator 1152, an amplitude multiplier 1153, a phase pre-distortion calculator 1154, a phase adder 1155, and an I/Q converter 1156.

The amplitude and phase converter 1151 converts an I/Q signal provided from the CFR unit 1110 to an amplitude 1151a and a phase 1151b.

The amplitude pre-distortion calculator 1152 calculates pre-distortion for an amplitude using at least one of the amplitude 1151a converted by the amplitude and phase converter 1151, a Vdd value based on a reduced bandwidth envelope signal 1140a, a Look Up Table (LUT) of an amplitude updated while the calibrator 1180 performs calibration, and a modeling equation 1180a of the PA 1280.

The amplitude multiplier 1153 multiplies the value calculated by the amplitude pre-distortion calculator 1152 by the amplitude 1151a converted by the amplitude and phase converter 1151.

The phase pre-distortion calculator 1154 calculates a phase pre-distortion using at least one of an amplitude value to which amplitude pre-distortion has been applied by the amplitude pre-distortion calculator 1152, a Vdd value based on a reduced bandwidth envelope signal 1140a, an LUT of a phase updated while the calibrator 1180 performs calibration, and a modeling equation 1180b of the PA 1280.

The phase adder 1155 adds a value calculated by the phase pre-distortion calculator 1154 to the phase 1151b converted by the amplitude and phase converter 1151.

The I/Q converter 1156 converts an amplitude and/or phase signal to which pre-distortion output from the amplitude multiplier 1153 and/or the phase adder 1155 has been applied to an I/Q signal.

An I/Q signal output from the resealing DPD unit 1150 passes through the I/Q mismatch unit 1160 and the ISF 1170 and is transferred to the second DAC 1240 of the RF unit 1200, passes through the second LPF 1250, the up-converter 1260, and the DA 1270. Thereafter, power of the signal is amplified by the PA 1280.

Meanwhile, an RF I/Q signal obtained by the PA 1280 passes through the down-converter 1290, the third LPF 1295, and the ADC 1190, and is fed back to the calibration performing unit 1180.

The calibration performing unit 1180 compares a signal transmitted from the CFR unit 1110 with output power of the PA 1280 received via the feedback path to perform calibration on the 1D resealing DPD unit 1150.

A method for performing calibration on the resealing DPD unit 1150 may include a parametric approach that uses a modeling equation of the PA 1280 and an LUT method that tables measurement values and uses the modeling equation of the PA 1280.

Hereinafter, description is made on an exemplary method for performing calibration on the resealing DPD unit 1150 using a parametric approach at the calibration performing unit 1180. However, the description is also applicable to a case of performing calibration on the resealing DPD unit 1150 using the LUT method at the calibration performing unit 1180.

Figure 15:
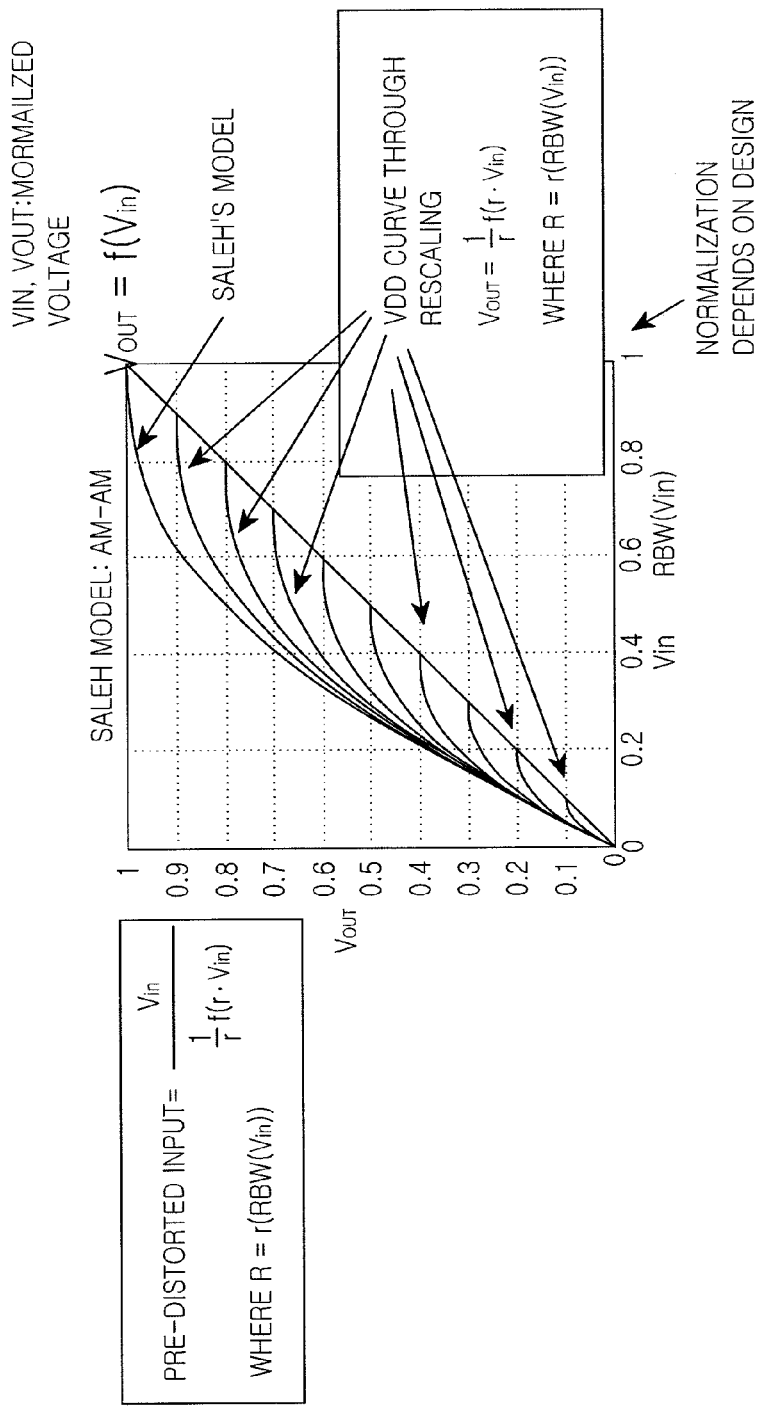
FIG. 15 is a graph illustrating a 1D resealing DPD according to an exemplary embodiment of the present invention.

FIG. 15 is a graph illustrating a 1D resealing DPD according to an exemplary embodiment of the present invention.

Referring to FIG. 15, assuming that a voltage is normalized, for example, in a case where 0≤Vin,Vdd,Vout≤1 is met, a calibration algorithm may be performed as presented in Table 1 below.

TABLE 1

Pick T temperature levels : e.g., t = {Low, Mid, High}
Pick M Vdd levels : e.g., m = {0.5V, 1.7V, 3.4V, 4.5V}
Pick N Vin levels from 0 to Vdd(m), i.e., Vin(n)=n*Vdd(m)/N
For t in T
　For m=1 to M
　　For n=1 to N
　　　Record output voltage/phase level
　　　Vout(m,n), Pout(m,n) for Vdd(m) and Vin(n)
　　End
　　Use least square (or other curve fitting) methods to find best matching amplitude parameters (alpha_a(m), beta_a(m)) and phase parameters (alpha_ph(m), beta_ph(m)) using {Vout(m,1), Vout(m,2), , Vout(m,N)} which is Vout = f(Vin ; alpha_a, beta_a) and Pout = g(Vin ; alpha_p, beta_p)
end Referring Table 1, the calibration algorithm picks T temperature levels, M Vdd levels, and N Vin levels. Herein, the Vin levels are picked from a range of 0 to Vdd(m). For all of temperature levels, all of Vdd levels and all of Vin levels, the calibration algorithm repeatedly records out voltage/phase levels, and repeatedly determines Vout and Pout. Thereafter, the calibration algorithm determines best matching amplitude parameters and phase parameters.

After the calibration algorithm is performed, tables of the number of TxMx (i.e., # number of amplitude and phase parameters) are stored. For modeling equations of a usable PA 1280, Saleh, Rapp, Ghorbani models, and the like, may be used. An equation suitable for a characteristic of a PA in use may be selected and modeled in advance.

A pre-distortion with a 1D Resealing algorithm is illustrated with respect to Table 2 below.

TABLE 2

For given (Vin, Vdd) where Vin, Vdd are arbitrary values in [0,1]
　Find m, such that Vdd(m)<=Vdd<Vdd(m+1)
　Find r, such that Vdd = r * Vdd(m) + (1-r)*Vdd(m+1)
　Calculate alpha_a = r*alpha_a(m) + (1-r)*alpha_a(m+1)
　Calculate beta_a = r*beta_a(m) + (1-r)*beta_a(m+1)
　Calculate alpha_p = r*alpha_p(m) + (1-r)*alpha_p(m+1)
　Calculate beta_p = r*beta_p(m) + (1-r)*beta_p(m+1)
　Calculate pre-distorted voltage and phase using
　Vpre = Vdd * f( Vin / Vdd ; alpha_a, beta_a)
　Ppre = Vdd * g( Vin / Vdd : alpha_p, beta_p)

Referring Table 2, the Resealing algorithm determines Vdd level m, such that Vdd(m)≤Vdd<Vdd(m+1), and determines r, such that Vdd=r×Vdd(m)+(1−r)×Vdd(m+1). In addition, the Resealing algorithm determines alpha_a, beta_a, alpha_p, beta_p and pre-distorted voltage and phase using Vpre and Ppre.

Such an algorithm corresponds to using r=r(RBW (Vin))=1/Vdd in FIG. 15. Referring to FIG. 15, assuming that one fixed Vdd voltage M={4.5V}, which is a maximum Vdd voltage, the resealing DPD unit 1150 measures Vout values with respect to N Vins, for example, {1/N*4.5, . . . , N/N*4.5}V, and finds out a most suitable curve. Thereafter, the resealing DPD unit 1150 calculates a pre-distortion value using a resealing function with respect to an arbitrary Vdd, not a maximum voltage. The resealing DPD unit 1150 similarly updates a 1D LUT with respect to a maximum Vdd voltage and rescales and uses other voltages even in a case of using the LUT method. Accordingly, a description of the LUT method is omitted.

Figure 16:
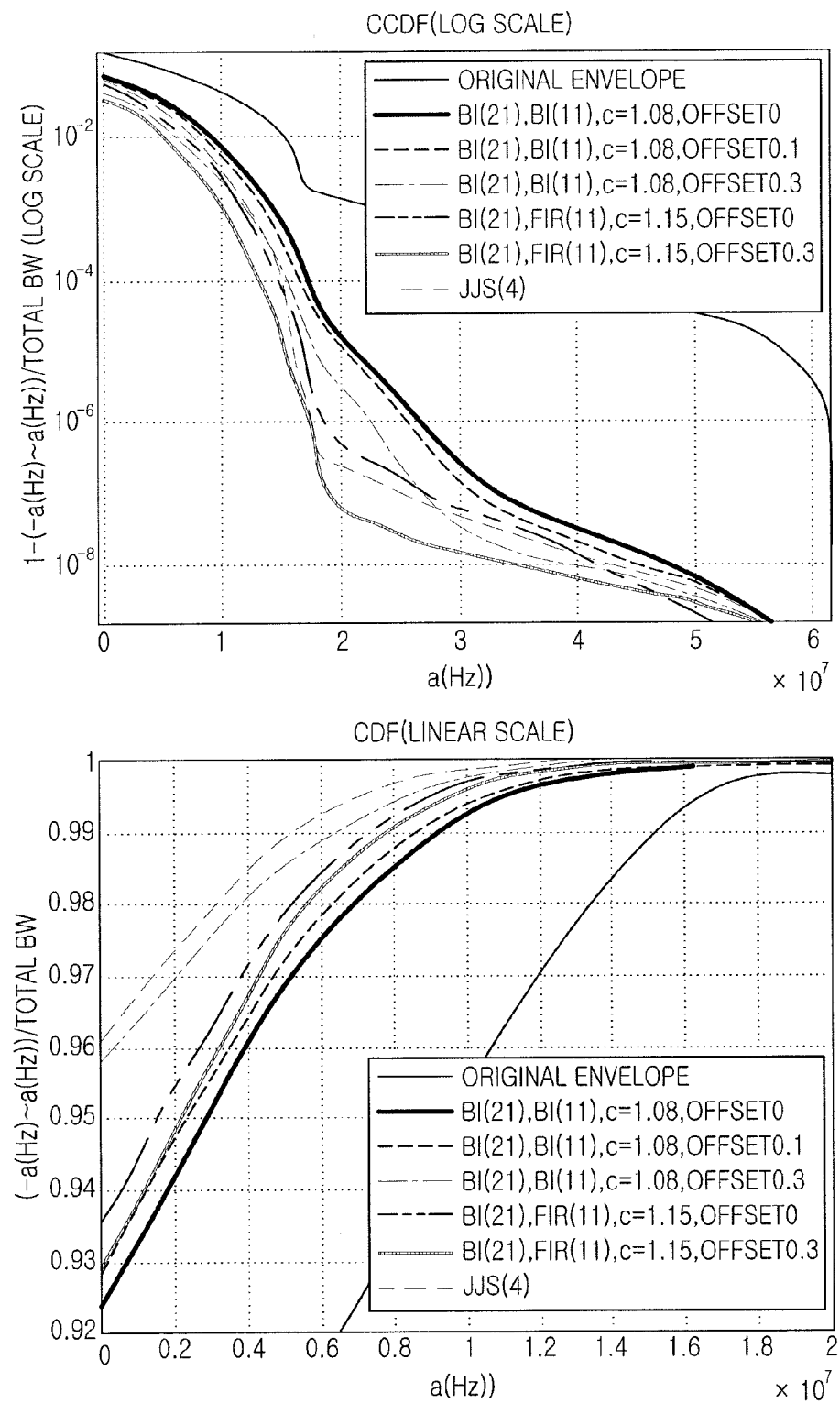
FIG. 16 illustrates graphs of different bandwidth reduction effects of cases of using a SWED algorithm according to an exemplary embodiment of the present invention.

When the SWED algorithm is used according to an exemplary embodiment of the present invention, an effect of a reduced bandwidth may be represented, as illustrated in FIG. 16.

FIG. 16 illustrates graphs of different bandwidth reduction effects of cases of using a SWED algorithm according to an exemplary embodiment of the present invention.

Referring to FIG. 16, Bi(21), Bi(11), c=1.08, and offset0 denote that the WED of the SWED sets a 21 tap length Binomial window, an 11 tap length Binomial LPF, a gain control factor 1.08, and the knee voltage (offset)=0. JJS(4) denotes comparison with results of four times of iteration in a J. Jeong paper method. When compared with the original envelope, an effect of a definite reduced bandwidth may be determined.

Figure 17:
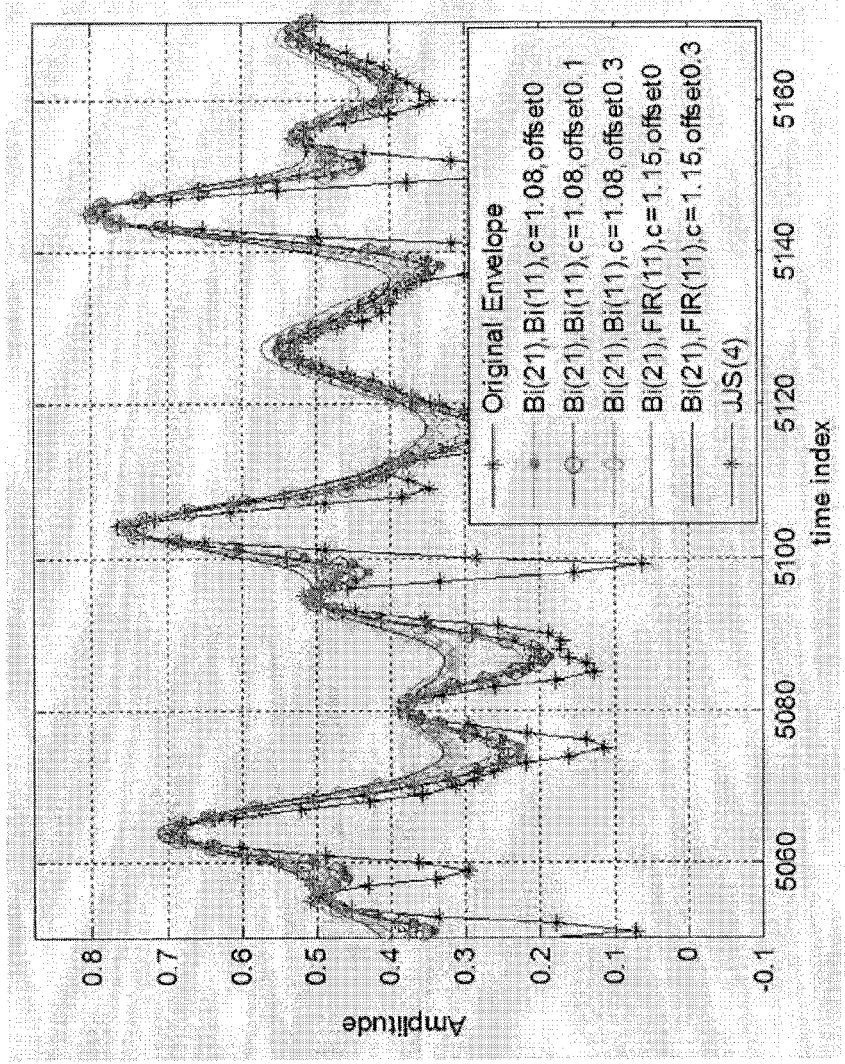
FIG. 17 is a graph illustrating a bandwidth reduction effect of a case of using a SWED algorithm according to an exemplary embodiment of the present invention.

An envelope before application of an exemplary embodiment of the present invention and a reduced bandwidth envelope according to an exemplary embodiment of the present invention may be illustrated in FIG. 17.

FIG. 17 is a graph illustrating a bandwidth reduction effect of a case of using a SWED algorithm according to an exemplary embodiment of the present invention.

Referring to FIG. 17, a window used by the SWED may be changed to Hanning, Hamming, Kaiser, Nuttal, Binominal, and the like. In addition, it is advantageous in an aspect of the operation that a determined window may control a length of the number of taps to obtain desired reduced bandwidth effects.

At this point, simulation of an ideal power efficiency obtains Table 3 below, which shows that almost the same efficiency as the J. Jeong method can be obtained. For example, since the SWED algorithm may obtain a similar performance using much smaller sized hardware, it can be used in a terminal modem.

TABLE 3

| CASE | PA efficiency |
| --- | --- |
| Binom(21), Binom (11), c = 1.08, offset0 | 79.7746 |
| Binom(21), Binom (11), c = 1.08, offset0.1 | 79.5328 |
| Binom(21), Binom (11), c = 1.08, offset0.3 | 73.4961 |
| Binom(21), FIRLS(11), c = 1.15, offset0 | 71.2293 |
| Binom(21), FIRLS(11), c = 1.15, offset0.3 | 70.6566 |
| JJS (4) | 79.8751 |
| Original Envelope | 14.7 |

According to an exemplary embodiment of the present invention, in a case of using 1D resealing DPD, only a minimum memory storage space is used, and as a result, DPD of a level similar to a 2-dimensional (2D) DPD may be applied. Compared to a 2D LUT method, a pre-distortion value may be easily calculated with respect to an arbitrary Vdd value.

Figure 18:
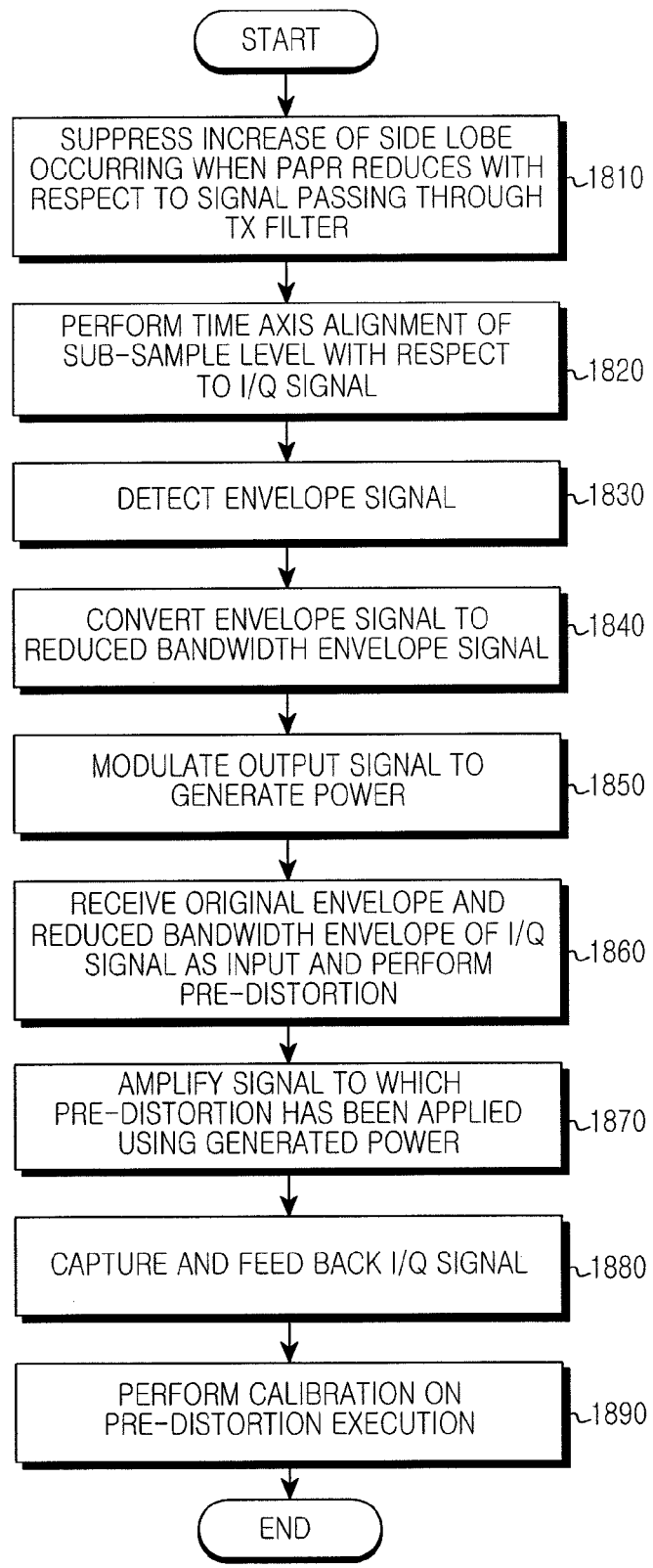
FIG. 18 is a flowchart illustrating a method for processing reduced bandwidth ET and DPD according to an exemplary embodiment of the present invention.

FIG. 18 is a flowchart illustrating a method for processing reduced bandwidth ET and DPD according to an exemplary embodiment of the present invention.

Referring to FIGS. 10 and 18, in step 1810, the CFR unit 1110 suppresses an increase of a side lobe that occurs when a PAPR decreases with respect to a signal that has been generated in a baseband according to a standard and passed through a Tx filter.

In step 1820, the fractional delay filter 1120 performs time axis alignment of a sub-sample level on an I/Q signal output from the CFR unit 1110.

In step 1830, the envelope detector 1130 detects an envelope signal by calculating a square root of (I2+Q2) of an I/Q signal output from the fractional delay filter 1120.

In step 1840, the envelope converter 1140 converts an envelope signal detected by the envelope detector 1130 to a reduced bandwidth envelope.

Figure 19:
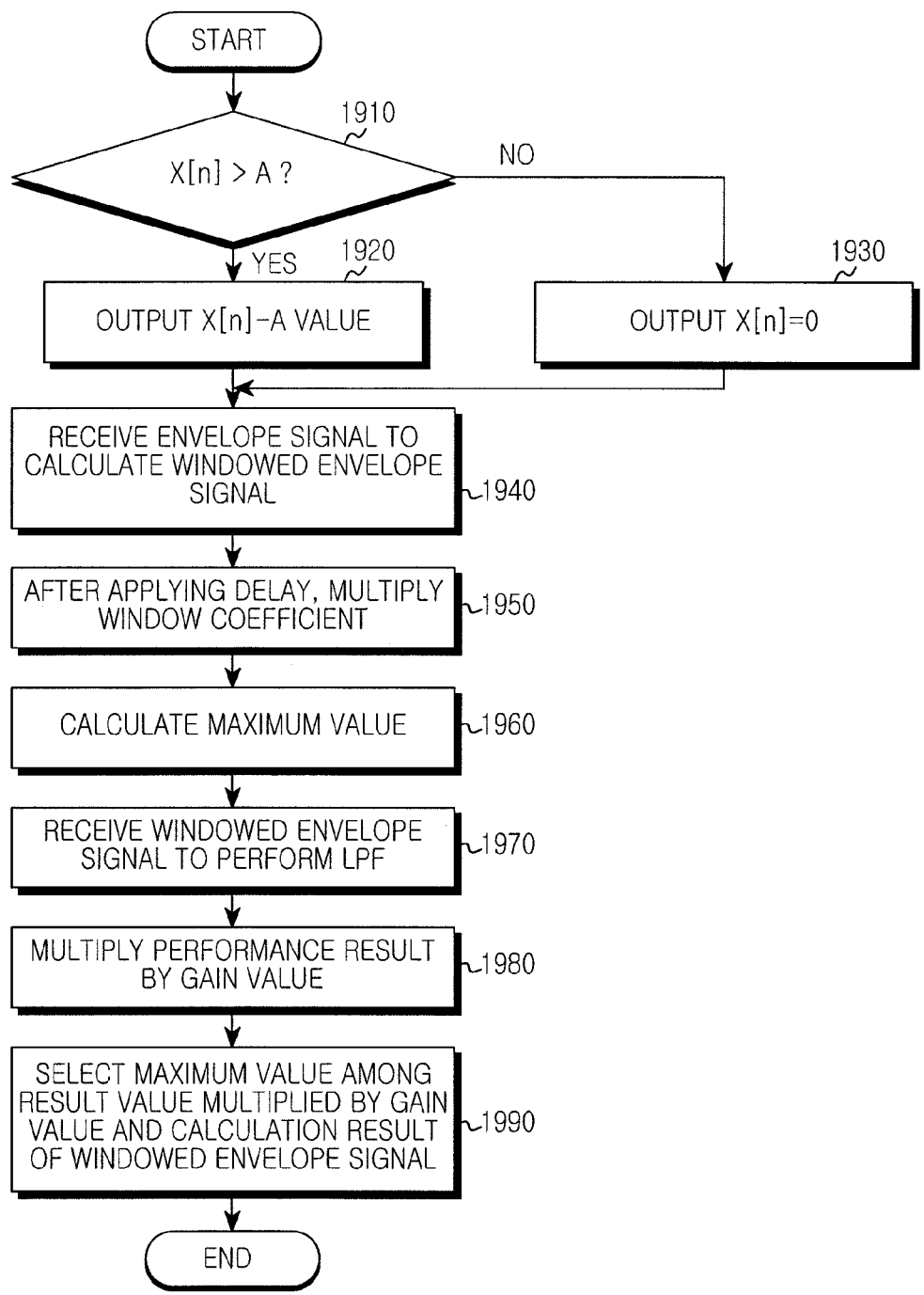
FIG. 19 is a flowchart illustrating an envelope converting process according to an exemplary embodiment of the present invention.

FIG. 19 is a flowchart illustrating an envelope converting process according to an exemplary embodiment of the present invention.

Referring to FIG. 19, in step 1910, a process determines whether an envelope input signal x[n] is greater than a set knee voltage (A). The envelope converting process 1840 may include a process where when an envelope input signal x[n] is determined in step 1910 to be greater than a set knee voltage (A), the half-wave rectifier 1142 outputs a value in step 1920 obtained by subtracting the knee voltage (A) from the envelope input signal x[n], and when the envelope input signal x[n] is less than the set knee voltage (A), the half-wave rectifier 1142 outputs zero in step 1930.

In step 1940, the envelope converting process 1840 may include a process for receiving an envelope signal q(n) and calculating a windowed envelope signal E{q(n)}, a process in step 1950 for applying delay within the process for calculating a windowed envelope signal and multiplying a window coefficient, and a process in step 1960 for calculating a maximum value of results multiplied by a window coefficient via the window coefficient multiply process. At this point, the LPF 1146 may receive a windowed envelope signal E{q(n)} to perform low pass filtering in step 1970. The gain control performing unit 1148 multiplies a result of the low pass filtering by the LPF 1146 by a scaling factor alpha (gain value) to make the multiplied result be greater than the envelope in step 1980. In this case, the envelope converter 1140 may select a maximum value among a value multiplied by a gain value by the gain control performing unit 1148 and an output value of the WED 1144 in step 1990.

A signal output from the envelope converter 1140 is transferred to the first DAC 1210 and the resealing DPD unit 1150 of the RF unit 1200. In step 1850, the SM 1230 operates depending on an amplitude of a reduced bandwidth envelope of a signal that has passed through the first LPF 1220 and is time axis-aligned and generates a proper Vdd voltage suitable for the amplitude of the signal to provide the proper Vdd voltage to the PA 1280.

Meanwhile, in step 1860, the resealing DPD unit 1150 receives an original envelope amplitude and a reduced bandwidth envelope amplitude with respect to an I/Q signal output from the CFR unit 1110 to perform pre-distortion. At this point, the pre-distortion process by the resealing DPD unit 1150 may be described via a pre-distortion process illustrated in FIG. 20.

Figure 20:
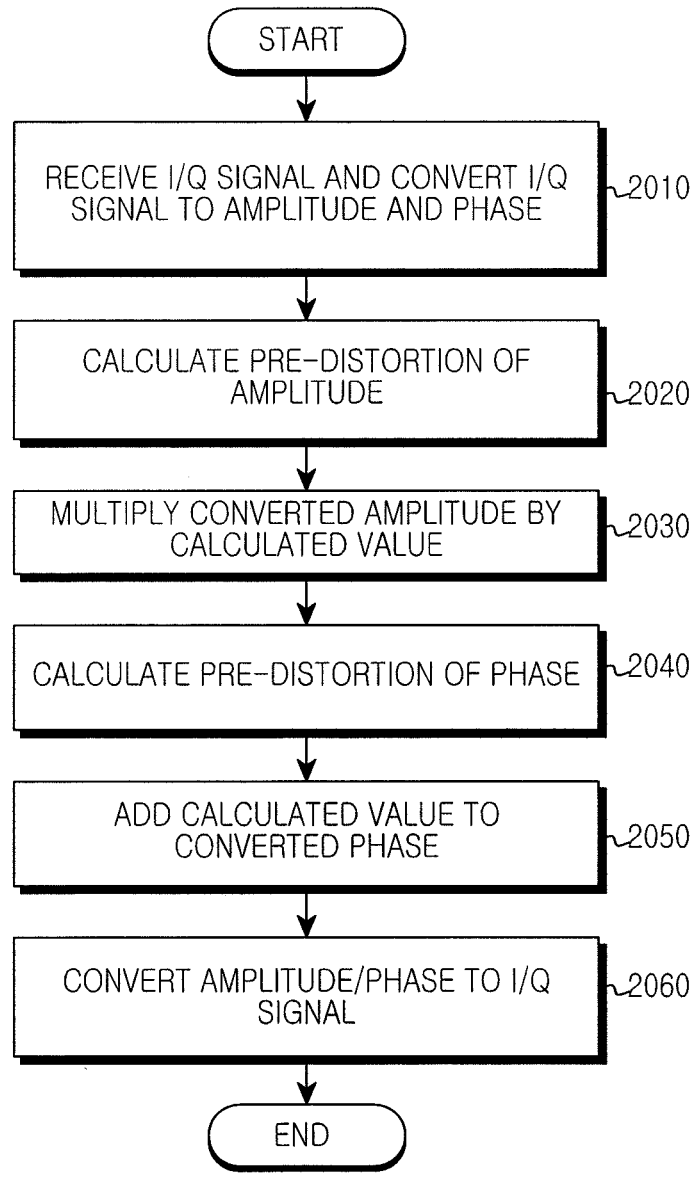
FIG. 20 is a flowchart illustrating a pre-distortion process according to an exemplary embodiment of the present invention.

FIG. 20 is a flowchart illustrating a pre-distortion process according to an exemplary embodiment of the present invention.

Referring to FIG. 20, in step 2010, the amplitude and phase converter 1151 may receive an I/Q signal from the CFR 1110 to convert the I/Q signal to the amplitude 1151a and the phase 1151b.

In step 2020, the amplitude pre-distortion calculator 1152 may calculate pre-distortion for an amplitude using at least one of the amplitude 1151a converted by the amplitude and phase converter 1151, a Vdd value 1140a based on a reduced bandwidth envelope signal, an LUT of an amplitude updated while calibration is performed by the calibrator 1180, and a modeling equation 1180a of the PA 1280.

In step 2030, the amplitude multiplier 1153 multiplies a value calculated by the amplitude pre-distortion calculator 1152 by the amplitude 1151a converted by the amplitude and phase converter 1151.

In step 2040, the phase pre-distortion calculator 1154 may calculate pre-distortion for a phase using at least one of an amplitude value to which amplitude pre-distortion has been applied by the amplitude pre-distortion calculator 1152, a Vdd value 1140a based on a reduced bandwidth envelope signal, an LUT of a phase updated while calibration is performed by the calibrator 1180, and a modeling equation 1180b of the PA 1280.

In step 2050, the phase adder 1155 adds a value calculated by the phase pre-distortion calculator 1154 to the phase 1151b converted by the amplitude and phase converter 1151.

In step 2060, the I/Q converter 1156 may convert an amplitude and/or phase signal to which pre-distortion output from the amplitude multiplier 1153 and/or the phase adder 1155 to an I/Q signal.

Referring back to FIG. 18, an I/Q signal output from the resealing DPD unit 1150 is transferred to the second DAC 1240 of the RF unit 1200 by way of the I/Q mismatch unit 1160 and the ISF 1170, and passes through the second LPF 1250, the up-converter 1260, and the DA 1270, and in step 1870, signal power is amplified using a voltage Vdd generated by the PA 1280.

In step 1880, an RF I/Q signal obtained by the PA 1280 is fed back to the calibration performing unit 1180 by way of the down-converter 1290, the third LPF 1295, and the ADC 1190.

The calibration performing unit 1180 compares a signal transmitted from the CRF unit 1110 with output power of the PA 1280 received via the feedback path to perform calibration on the 1D resealing DPD unit 1150 in step 1890.

According to an exemplary embodiment of the present invention, an effect of a reduced bandwidth may be obtained compared with the original envelope.

According to another exemplary embodiment of the present invention, a window used in the SWED algorithm may be changed to Hanning, Hamming, Kaiser, Nuttal, Binominal, and the like. It is advantageous in an aspect of the operation that a determined window may control a length of the number of taps to obtain desired reduced bandwidth effects, it is much advantageous in an aspect of the operation.

According to another exemplary embodiment of the present invention, in a case of using 1D resealing DPD, only a minimum memory storage space is used, and as a result, DPD of a level similar to 2D DPD may be applied. Compared to a 2D LUT method, a pre-distortion value may be easily calculated with respect to an arbitrary Vdd value.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for processing reduced bandwidth Envelope Tracking (ET) and Digital Pre-Distortion (DPD), the apparatus comprising:
   a Crest Factor Reduction (CFR) unit configured to suppress an increase of a side lobe occurring when a Peak to Average Power Ratio (PAPR) decreases with respect to a signal generated in a baseband according to a standard and passes through a transmit (Tx) filter;
   a rescaling Digital Pre-Distortion (DPD) unit configured to receive an original envelope and a reduced bandwidth envelope of an In-phase/Quadrature-phase (I/Q) signal output from the CFR unit to perform a pre-distortion process;
   an envelope converter configured to convert an envelope signal to a reduced bandwidth envelope signal based on the I/Q signal output from the CFR unit;
   a Supply Modulator (SM) configured to modulate a signal output from the envelope converter to generate power; and
   a Power Amplifier (PA) configured to amplify an input signal based on a signal output from the rescaling DPD unit using power generated by the SM.

2. The apparatus of claim 1, further comprising:
   a down converter configured to down-convert the I/Q signal captured from the PA; and
   a calibration performing unit configured to compare the I/Q signal down-converted by the down converter with the I/Q signal output from the CFR unit to perform calibration on the rescaling DPD unit.

3. The apparatus of claim 1, further comprising:
   a fractional delay filter configured to perform time axis alignment of a sub-sample level on the I/Q signal output from the CFR unit.

4. The apparatus of claim 3, further comprising:
   an envelope detector configured to calculate a square root of (I2+Q2) with respect to the I/Q signal output from the fractional delay filter to detect the envelope signal.

5. The apparatus of claim 1, further comprising:
   a half-wave rectifier configured to output, when an envelope input signal is greater than a knee voltage, a value obtained by subtracting the knee voltage from the envelope input signal, and output zero, when the envelope input signal is less than the knee voltage;
   a gain control performing unit configured to perform gain control on an output of the envelope converter; and
   a knee voltage compensator configured to add the knee voltage to an output of the gain control performing unit.

6. The apparatus of claim 1, wherein the envelope converter comprises:
   a Window Envelope Detector (WED) configured to receive the envelope signal q(n) to calculate a windowed envelope signal E{q(n)};
   a window coefficient multiplier configured to apply a delay within the WED and multiply a window coefficient;
   a maximum value calculator configured to calculate a maximum value of results obtained by multiplying the window coefficient using the window coefficient multiplier; and
   a Low Pass Filtering (LPF) unit configured to receive the windowed envelope signal E{q(n)} to perform low pass filtering,
   wherein the envelope converter multiplies a result of the LPF unit by a gain value, and selects a maximum value among the value multiplied by the gain value and an output of the WED.

7. The apparatus of claim 1, wherein the rescaling DPD unit comprises:
   an amplitude and phase converter configured to receive the I/Q signal from the CFR unit and convert the I/Q signal to an amplitude and a phase;
   an amplitude pre-distortion calculator configured to calculate pre-distortion of the amplitude using at least one of the amplitude converted by the amplitude and phase converter, the reduced bandwidth envelope signal, an amplitude Look Up Table (LUT) updated while calibration is performed, and a modeling equation of the PA;
   an amplitude multiplier configured to multiply a value calculated by the amplitude pre-distortion calculator by the amplitude converted by the amplitude and phase converter;
   a phase pre-distortion calculator configured to calculate phase pre-distortion using at least one of the amplitude value to which amplitude pre-distortion has been applied by the amplitude pre-distortion calculator, the reduced bandwidth envelope signal, a phase LUT updated while calibration is performed, and a modeling equation of the PA;
   a phase adder configured to add a value calculated by the phase pre-distortion calculator to the phase converted by the phase converter; and
   an I/Q converter configured to convert the amplitude/phase signal, to which pre-distortion has been applied, to an I/Q signal.

8. A method for processing reduced bandwidth Envelope Tracking (ET) and Digital Pre-Distortion (DPD), the method comprising:
   suppressing an increase of a side lobe occurring when a Peak to Average Power Ratio (PAPR) decreases with respect to a signal generated in a baseband according to a standard and passes through a transmit (Tx) filter;
   converting an envelope signal to a reduced bandwidth envelope signal based on an In-phase/Quadrature-phase (I/Q) signal output via the side lobe increase suppression process;
   receiving an original envelope and a reduced bandwidth envelope of the I/Q signal output via the side lobe increase suppression process to perform a pre-distortion process;
   modulating a signal output via the envelope signal converting process to generate power;
   amplifying an input signal based on a signal output via the pre-distortion process using the generated power;
   capturing the I/Q signal from a Power Amplifier (PA) and down-converting the I/Q signal; and
   performing calibration of the pre-distortion process by comparing the down-converted I/Q signal with a signal output via the side lobe increase suppression process.

9. The method of claim 8, further comprising:
   performing time axis alignment of a sub-sample level on the I/Q signal output via the side lobe increase suppression process.

10. The method of claim 9, further comprising:
calculating a square root of (I2+Q2) with respect to the I/Q signal, output via the time axis alignment performing process, to detect an envelope signal.

11. The method of claim 8, wherein the envelope signal converting process comprises:
when an envelope input signal is greater than a knee voltage, outputting a value obtained by subtracting the knee voltage from the envelope input signal, and when the envelope input signal is less than the knee voltage, outputting zero;
performing gain control on an output via the envelope signal converting process; and
adding the knee voltage to an output via the gain control performing process.

12. The method of claim 8, wherein the envelope signal converting process comprises:
receiving the envelope signal q(n) to calculate a windowed envelope signal E{q(n)};
applying a delay within the windowed envelope signal calculation process and multiplying a windowed coefficient;
calculating a maximum value of results multiplied by the window coefficient;
receiving the windowed envelope signal E{q(n)} to perform Low Pass Filtering (LPF); and
multiplying the LPF performance result by a gain value, and selecting a maximum value among an output value multiplied by the gain value and an output of the calculation process of the windowed envelope signal.

13. The method of claim 8, wherein the pre-distortion process comprises:
receiving the I/Q signal via the side lobe increase suppression process to convert the I/Q signal to an amplitude and a phase;
calculating pre-distortion of the amplitude using at least one of the amplitude converted by the converting process, the reduced bandwidth envelope signal, an amplitude Look Up Table (LUT) updated while calibration is performed, and a modeling equation of the PA;
multiplying a value calculated by the amplitude pre-distortion calculation process by the amplitude converted by the converting process;
calculating phase pre-distortion using at least one of the amplitude value to which amplitude pre-distortion has been applied by the amplitude pre-distortion calculation process, the reduced bandwidth envelope signal, a phase LUT updated while calibration is performed, and a modeling equation of the PA;
adding a value calculated by the phase pre-distortion calculation process to the phase converted by the phase converting process; and
converting an amplitude/phase signal, to which pre-distortion has been applied, to the I/Q signal.

* * * * *